J. C. STILLMAN.
FURNACE FOR HOT AIR HEATING SYSTEMS.
APPLICATION FILED SEPT. 16, 1912.

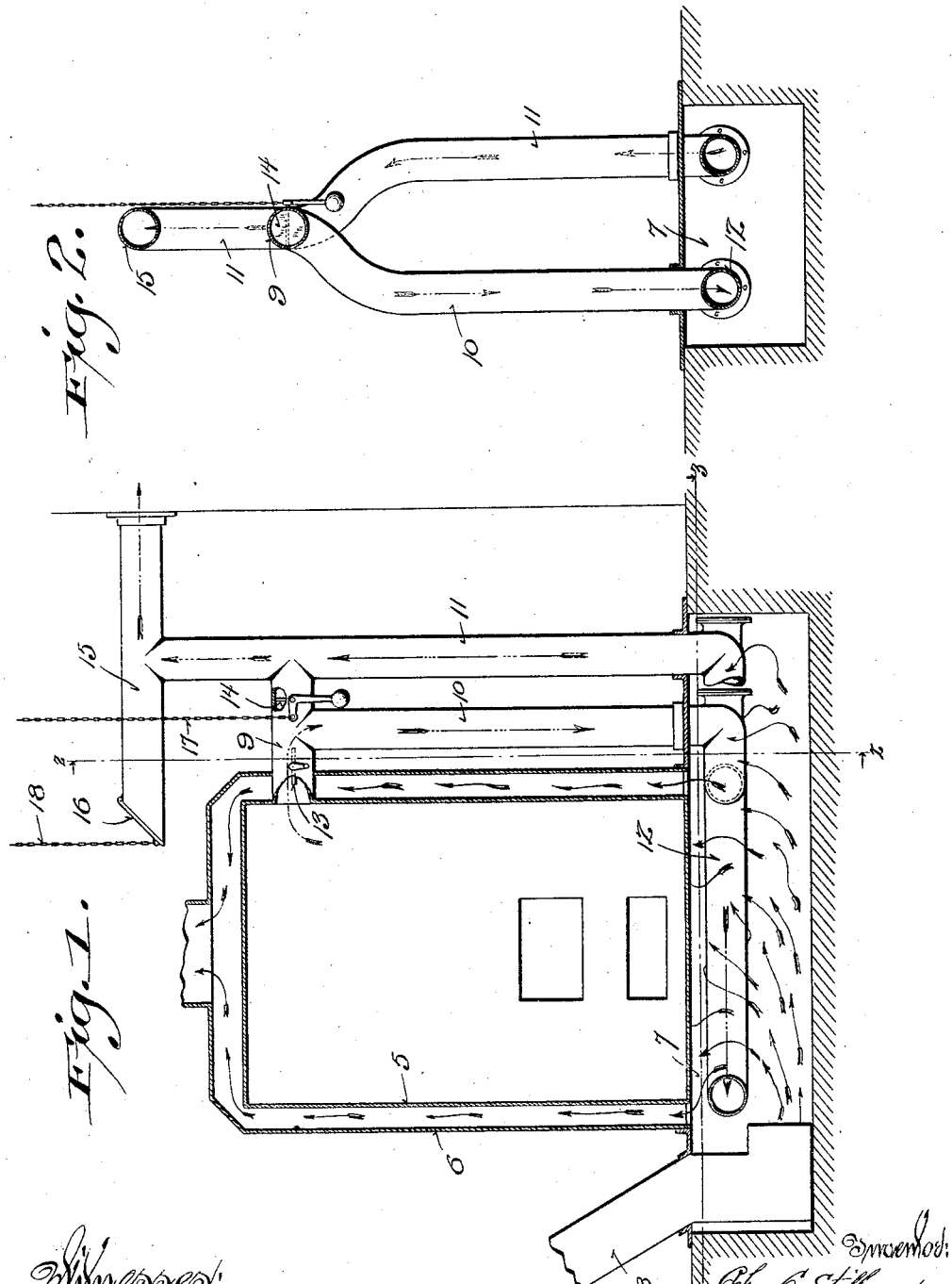

1,110,466.

Patented Sept. 15, 1914.
2 SHEETS—SHEET 2.

UNITED STATES PATENT OFFICE.

JOHN C. STILLMAN, OF MILWAUKEE, WISCONSIN, ASSIGNOR OF ONE-FOURTH TO EDWIN S. STILLMAN, ONE-FOURTH TO HALBERT E. KELTNER, AND ONE-FOURTH TO FREDERICK O. ROSSITER, ALL OF MILWAUKEE, WISCONSIN.

FURNACE FOR HOT-AIR HEATING SYSTEMS.

1,110,466.      Specification of Letters Patent.      Patented Sept. 15, 1914.

Application filed September 16, 1912. Serial No. 720,684.

*To all whom it may concern:*

Be it known that I, JOHN C. STILLMAN, a citizen of the United States, and resident of Milwaukee, in the county of Milwaukee and State of Wisconsin, have invented certain new and useful Improvements in Furnaces for Hot-Air Heating Systems; and I do hereby declare that the following is a full, clear, and exact description thereof.

My invention consists in what is herein particularly set forth with reference to the accompanying drawings and pointed out in the claims of this specification, its object being to provide means in conjunction with a well known type of hot-air heating furnace for the utilization of what is ordinarily waste heat to initially attemper the cold air supplied to said furnace.

Figure 3:
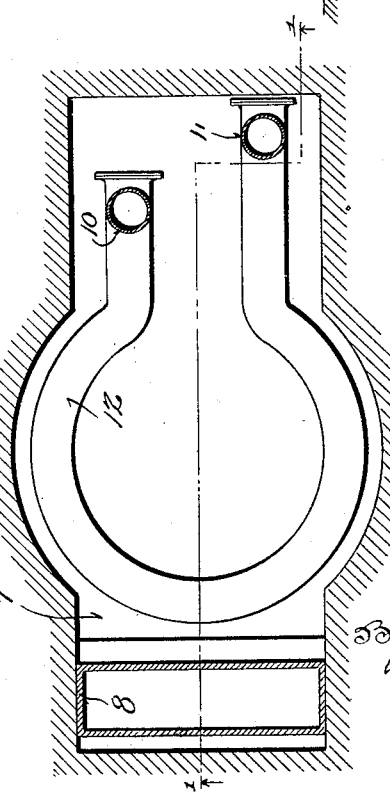

Figure 1 represents a partly sectional elevation of means in accordance with my invention for initial attempering of cold air supplied to the furnace of a hot-air heating system, the plane of the section being indicated by line 1—1 in Fig. 3; Figs. 2 and 3, sectional views respectively indicated by lines 2—2 and 3—3 in Fig. 1, and Fig. 4, a view similar to said Fig. 1, illustrating another carrying out of said invention.

Referring by numerals to the drawings, 5 indicates the lining and 6 the jacket of a hot-air furnace, the space between said lining and jacket being in communication at the bottom of the furnace with an underlying covered pit 7 independent of the furnace and into which the cold-air duct 8 of said furnace has its outlet. Leading from the combustion-chamber of the furnace, through the jacket 6, adjacent to the upper end thereof, is a horizontal flue 9, in communication with a pair of vertical flues 10, 11, that in turn communicate with the terminals of a suitably bent horizontal flue 12 in the pit aforesaid, said terminals of the latter flue being capped.

The horizontal flue 9 is provided with dampers 13, 14, on opposite sides of the flue 10. In Fig. 1, the flue 11 is shown as having communication with a smoke-duct 15 that leads to a chimney and is provided at its inner end with a check-damper 16 as is customary in hot-air furnace heating practice.

Figure 4:
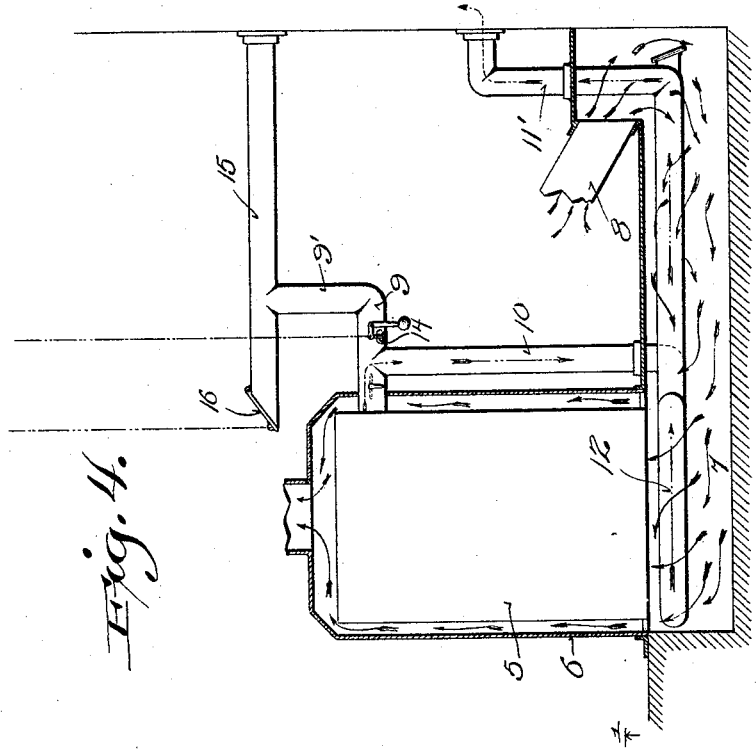

As shown in Fig. 4, a vertical branch 9' of the flue 9 may be in communication with the smoke-duct 15, and the flue 11' in direct communication, with the chimney below said flue 9, the cold-air pit being shown extended to said chimney and provided with a vertical extension 7' through which said flue extends and with which the cold-air duct 7 communicates.

In practice both of the dampers 13, 14, are adjusted to open the flue 9 to the smoke-duct 15 when starting fire in the furnace, the check-damper being then in the position shown in Figs. 1 and 4, but thereafter the preferably weighted damper 14 is positioned, as shown by full lines in Fig. 1, to cut off said flue 9 from said smoke-duct. This being the case the products of combustion on their way to the atmosphere are drawn down the flue 10, around in the flue 12 and up in the flue 11 to the chimney either direct or through the smoke-duct 15 according to the disposition of said flue 11. By circulating products of combustion in the flue 12 within the confines of the pit 7, the incoming air from the duct 8 is initially attempered on its way to the space between the lining and jacket of the furnace, whereby an economy of fuel results, because of the utilization of what are ordinarily waste products of combustion, in hot-air furnace heating practice, to influence the cold air supply. The draft through the combined flues 9, 10, 12 and 11 is regulated by the adjustments of the damper 13, and the dampers 14 and 16 may be connected to chains 17, 18, respectively, that lead to a compartment above the furnace room for convenience in the regulation of the main draft, as is customary in the practice aforesaid.

My invention is applicable to either new or old furnaces because of the flue 10 leading to the one 12 in the air-pit and the flue 11 leading from the one 12 to the chimney, either indirect or direct, are wholly outside of the confines of the furnace.

From the foregoing it will be understood that my invention is restricted to the outside down-draft flue 10, the horizontal circulating flue 12 disposed in the cold air pit and the peculiarly arranged damper 13.

I claim:

1. The combination of a hot-air furnace mounted over a cold-air pit and having a damper-controlled horizontal upper smoke flue leading outward from the combustion-chamber through the furnace-jacket, a horizontal smoke-duct in communication with a chimney and connected with the upper end of the smoke-flue, a horizontal circulating flue in said pit, an exposed vertical flue connecting said smoke-flue with one end of the circulating flue, and another exposed vertical flue connecting the other end of said circulating flue and the outer end of the smoke-flue with said smoke-duct.

2. The combination of a hot-air furnace mounted over a cold-air pit and having an upper horizontal smoke-flue extending from the combustion-chamber outward through the furnace-jacket, a horizontal smoke-duct in communication with a chimney and connected with the upper end of the smoke-flue, a horizontal circulating flue in said pit, an exposed vertical flue connecting said smoke-flue with one end of the circulating flue, another exposed vertical flue connecting the other end of said circulating flue and the outer end of the smoke-flue with said smoke-duct, and dampers in the smoke-flue in opposite directions from the first of said vertical flues.

In testimony that I claim the foregoing I have hereunto set my hand at Milwaukee in the county of Milwaukee and State of Wisconsin in the presence of two witnesses.

JOHN C. STILLMAN.

Witnesses:
 MAY DOWNEY,
 CASANAVE YOUNG.

---

Copies of this patent may be obtained for five cents each, by addressing the "Commissioner of Patents, Washington, D. C."